No. 609,827. Patented Aug. 30, 1898.
P. T. MERRILL.
POWDER DISTRIBUTING APPARATUS.
(Application filed Nov. 2, 1897.)

(No Model.)

WITNESSES
Ed. Hirt
J. Murphy

INVENTOR
Phineas T. Merrill
BY
Jas. H. Churchill
ATTORNEY.

UNITED STATES PATENT OFFICE.

PHINEAS T. MERRILL, OF BOSTON, MASSACHUSETTS.

POWDER-DISTRIBUTING APPARATUS.

SPECIFICATION forming part of Letters Patent No. 609,827, dated August 30, 1898.

Application filed November 2, 1897. Serial No. 657,175. (No model.)

*To all whom it may concern:*

Be it known that I, PHINEAS T. MERRILL, residing in Boston, in the county of Suffolk and State of Massachusetts, have invented an Improvement in Powder-Distributing Apparatus, of which the following description, in connection with the accompanying drawings, is a specification, like letters on the drawings representing like parts.

This invention relates to a device or apparatus for shaking or distributing material in powdered form upon or over plants, vines, &c., and has for its object to provide a simple, cheap, and efficient apparatus by which an even distribution of the powder over a substantially wide range or area may be effected.

In accordance with this invention the apparatus consists of a receptacle for the powder, having its bottom provided with a plurality of small outlets or openings for the powder, and a handle which is positively yet loosely attached to the said receptacle, so that by movement of the handle a slight or limited motion is given to the receptacle, which motion is limited by the handle, so as to impart to the receptacle a slight blow, which has the effect of shaking or discharging the powder in the receptacle out therefrom through the holes or openings in its bottom. I prefer to connect the handle to the receptacle, so that the latter is given a rotary movement, which has the effect of distributing the powder over a greater area and also serves to keep the powder in the receptacle evenly distributed over the bottom of the receptacle.

These and other features of this invention will be pointed out in the claim at the end of this specification.

Figure 1:
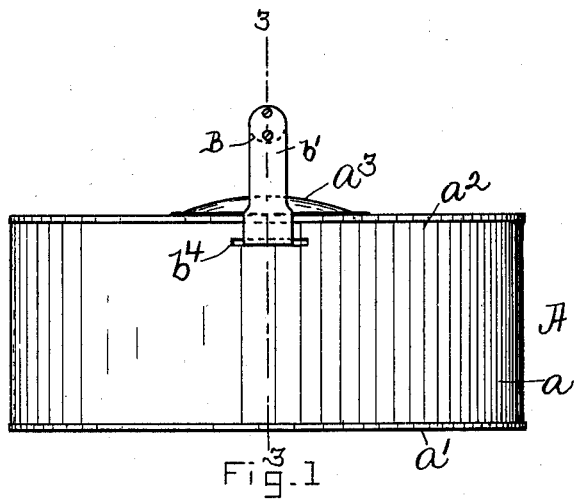
Figure 2:
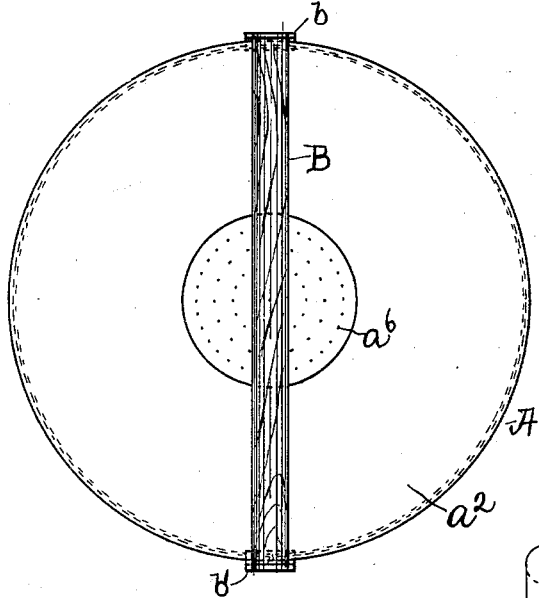
Figure 3:
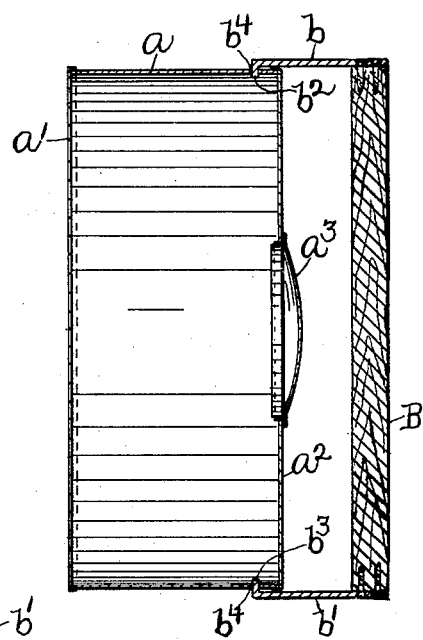

Figure 1 is a side elevation of an apparatus embodying this invention; Fig. 2, a top or plan view of the apparatus shown in Fig. 1 with the cover removed; Fig. 3, a sectional view on the line 3 3, Fig. 1; and Fig. 4, a modification to be referred to.

Referring to the drawings, A represents the receptacle for the powder, composed of a preferably circular body $a$, bottom $a'$, and top $a^2$, having an inlet-opening normally closed by a cover $a^3$. The receptacle A is preferably made of metal, and in order to obtain a most effective discharge of the powdered material placed in the receptacle the bottom $a'$ is preferably made of brass and provided with substantially small perforations, holes, or discharge-openings $a^6$, (represented by dots in Fig. 2,) which are regularly formed by drilling the said bottom, so as to leave the opposite surfaces of said bottom smooth and so that the openings $a^6$ may be of uniform diameter or size throughout their length, and thereby avoid tendency of the material to pack in said openings.

The receptacle A is provided with a bail or handle B, which is positively yet loosely attached to the same, so as to obtain the shaking effect desired. In the present instance the bail or handle B is provided with arms $b\ b'$, having lugs or ears $b^2\ b^3$, which extend into slots $b^4$ in the body $a$ substantially diametrically opposite, the said slots being longer than the width of the said lugs or ears, so that when the handle B is given an oscillating or rotary movement by turning the hand of the operator the body $a$ will be given a rotary movement and will slide on the ears or lugs until arrested in its movement by the ends of the slots $b^4$ bringing up against the sides of the lugs $b^2\ b^3$, thereby imparting to the receptacle a slight blow, which has the effect of discharging the powdered material through the substantially small perforations or holes in the bottom $a'$. The slight blow referred to coupled with the rotary movement of the receptacle has the effect of distributing the powder more evenly over a substantially wide range or area, which is especially desirable when the apparatus is used for applying the powder to potato and other vines, as it enables the operator to cover said vines, especially when full grown, more quickly and effectively, thereby enabling the operator to take care of a substantially large field or garden in a substantially short time.

My improved shaker or distributing apparatus is especially adapted for distributing the insecticide described in United States Patent No. 578,862, dated March 16, 1897, and by reason of its simplicity, cheapness, and efficiency enables farmers and gardeners to obtain it at a small cost and take care of substantially large tracts of land in a short time.

Figure 4:
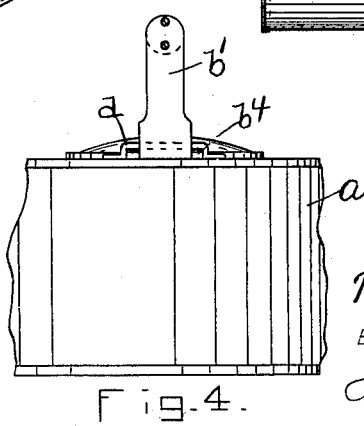

I prefer to provide the body $a$ with the slots $b^4$; but, if desired, the slots $b^4$ may be formed by soldering caps or raised pieces or bars $d$ to the top of the body $a$ at opposite points, as shown in Fig. 4.

I claim—

As an improved article of manufacture, a shaker or distributer for powdered material provided with a receptacle for the powder consisting of a body portion provided with a bottom having a plurality of substantially small openings, and having substantially diametrically opposite slots, and a handle having lugs or ears extended into said slots and of a width less than the length of the slots, substantially as and for the purpose specified.

In testimony whereof I have signed my name to this specification in the presence of two subscribing witnessses.

PHINEAS T. MERRILL.

Witnesses:
JAS. H. CHURCHILL,
J. MURPHY.